United States Patent [19]

Hartline et al.

[11] 3,735,260

[45] May 22, 1973

[54] PULSE COUNTING LINEAR MEASURING DEVICE

[75] Inventors: Rolland L. Hartline, Buchanan; Charles E. Kramer, Three Oaks, both of Mich.

[73] Assignee: Clark Equipment Company, Buchanan, Mich.

[22] Filed: Aug. 11, 1971

[21] Appl. No.: 170,879

[52] U.S. Cl. .................... 324/175, 324/178, 346/23, 346/33 D
[51] Int. Cl. ............................................... G01p 3/66
[58] Field of Search .................... 324/160, 161, 162, 324/166, 167, 171, 173, 174, 175, 178, 179, 180; 73/128, 129; 346/33 D, 23; 235/150.2, 151.32, 92 AE, 92 DM

[56] References Cited

UNITED STATES PATENTS

| | | | |
|---|---|---|---|
| 2,942,184 | 6/1960 | Sihvonen | 324/162 |
| 3,287,640 | 11/1966 | Rehage | 346/23 |
| 1,871,404 | 8/1932 | Brown | 324/175 |
| 2,705,303 | 3/1955 | Stinger | 324/174 |
| 3,530,382 | 9/1970 | Liston | 324/178 |

OTHER PUBLICATIONS

M. H. Westbrook – Electronic Measurement In the Automobile Industry – Electronics and Power – Nov., 1970 – pp. 406–410.

*Primary Examiner*—Michael J. Lynch
*Attorney*—Kenneth C. Witt, John C. Wressler and Jack E. Toliver et al.

[57] ABSTRACT

This is a pulse counting linear measuring and recording device utilizing a "fifth wheel" associated with a photocell to produce an electrical pulse each 0.1 foot of linear travel. The electrical pulses are counted and a larger pulse produced for each 1 foot of travel and a still larger pulse produced for each 10 feet of travel. These pulses are then presented vertically on a chart moving at a horizontal uniform rate. Provision is made for time interval presentation on the chart. The time interval may be automatically set at 6.82 seconds so that the counting of the 10 foot pulses gives equivalent miles per hour speed. The time interval also may be mechanically set at a desired starting event and ending event for a particular cycle.

6 Claims, 3 Drawing Figures

Patented May 22, 1973

INVENTORS
ROLLAND L. HARTLINE
CHARLES E. KRAMER
BY *Lewis J. Lamm*
ATTORNEY

INVENTORS
ROLLAND L. HARTLINE
CHARLES E. KRAMER

PULSE COUNTING LINEAR MEASURING DEVICE

BACKGROUND OF THE INVENTION

Fifth wheel devices with pulse counting circuits have been previously used as tachometer devices for indicating vehicle speeds and rates of acceleration or deceleration. Time interval devices have been used for determining average speed over a predetermined distance. It is also quite old to use charts in which the recording medium is moved at a uniform velocity with electrical events plotted vertically. These previous devices are quite satisfactory for measuring speeds in the order of several miles per hour and also quite satisfactory in measuring distances. The present invention is particularly adaptable for measuring very slow speeds over short distances of travel.

SUMMARY OF THE INVENTION

The present invention relates to apparatus for measuring and plotting distance-time functions of moving devices. It particularly relates to devices for plotting the distance-time function of a linear moving device through a predetermined time interval. The time interval may be predetermined as to time or predetermined as to starting and ending events. The present apparatus has provision for producing a pulse for every 0.1 foot movement and plotting this information on a chart. The information, once plotted, can be used for determining various distance-time functions. These distance-time functions include distance, speed, acceleration, deceleration and the rate of change of any of these functions.

It is an object of the present invention to provide a simple means for measuring and plotting linear distance-time functions of devices having low rates of speed.

Other objects of the present invention will become apparent upon reading the specification and will be particularly pointed out in the claims.

BRIEF DESCRIPTION OF THE DRAWING

Referring to the drawings.

Figure 2:
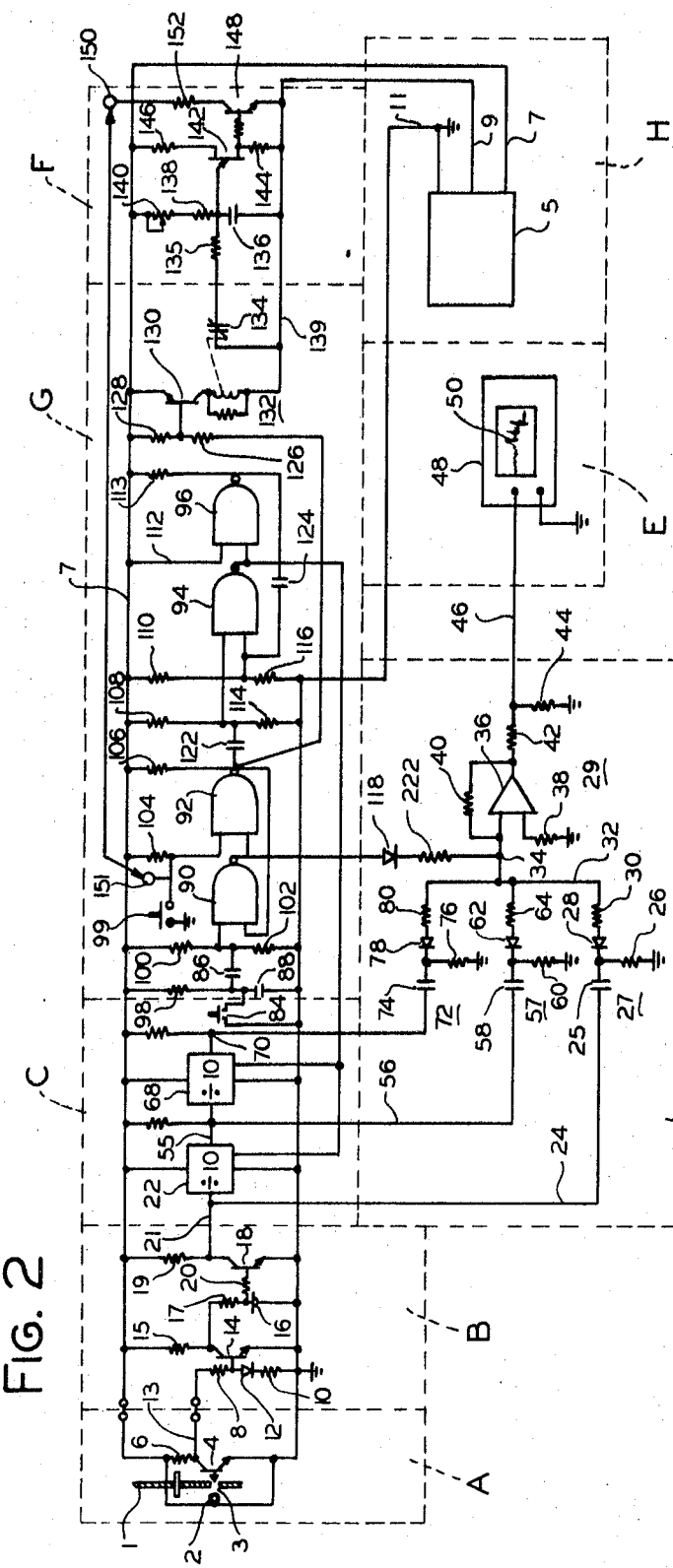

Referring briefly to FIG. 2, the dotted outline electrical function blocks generally enclose sub-circuits as follows: A is a pulse producing circuit substantially the same as shown in greater detail in FIG. 1; B is a pulse amplifying and shaping circuit; C illustrates two divide by 10 counting circuits; D contains pulse shape and size producing electrical signal differentiating circuits with amplifying means; E is the information display and recording means; F is a timing circuit; G is the control circuit; while H is the electrical power supply for all of the circuits.

Figure 3:
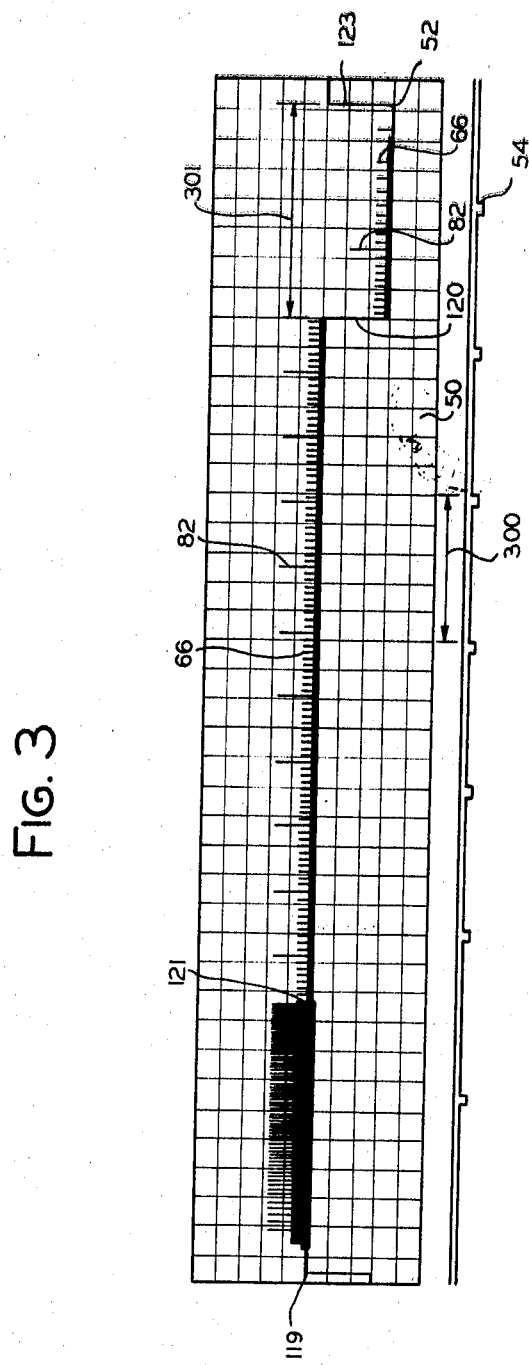

Referring to FIG. 3, the plot of the distance pulses versus the time movement of the chart as shown. The 0.1 foot pulses are shown as 52. The 1 foot pulses are 66 and the 10 foot pulses are 82. The 1 second time interval pulses are shown as 54.

DETAILED DESCRIPTION OF THE DRAWING

Figure 1:
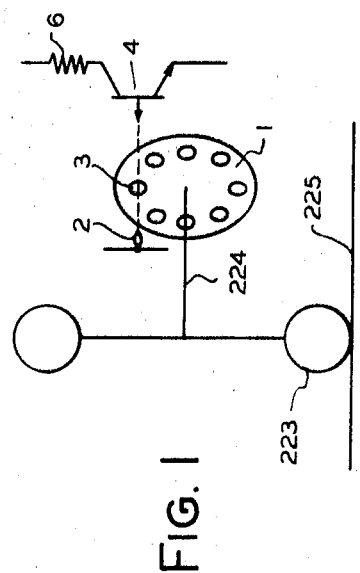
FIG. 1 illustrates the type of linear distance to electro pulse translating device particularly useful in the present invention. The type illustrated includes a wheel 223 which is rigidly attached by a shaft 224 to an opaque disc 1 having equally spaced transparent apertures 3 thereon. A light 2 and a photosensitive transducer 4 are located in alignment with the transparent apertures 3.

Referring now more particularly to FIG. 1 and to sub-circuit A in FIG. 2, 223 is a wheel of conventional design adaptable to roll over a surface the distance on which is to be measured. The wheel 223 is attached to an opaque disc 1 having equally spaced transparent areas 3 thereon by a shaft 224. The transparent areas 3 are in one particular embodiment of the invention, spaced an angular distance from each other equal to 0.1 foot linear movement of the wheel 223 on the surface 225 to be measured. 2 is a light source of any convenient type, while 4 is a light sensitive electrical transducer supplied by a positive polarity DC electrical potential of about 5 volts through resistant 6.

Referring to subcircuit B, FIG. 2, the signal from 4 is fed through 13, and resistor 8 and across diode 12 and the resistor 10 to the NPN transistor 14. 15 is a current limiting resistor. Resistor 17 and tunnel diode 16 shape the approximately one-half sine wave pulse output of transistor 14 into an approximately square wave. This approximately square-wave is fed through resistor 20 to the NPN transistor 18 for amplification. 19 is a current limiting resistor. The output of the subcircuit B transmitted through lines 21 and 24 include square wave pulses spaced at 1 pulse per 0.1 foot linear travel of the wheel 223. 22 is a "Divide by Ten" multiple flip-flop circuit which produces a square wave pulse for every 10 square wave pulses in the line 21. The output of 22 transmitted through lines 55 and 56 includes, therefore, a square wave having a pulse for each 1 foot travel of the wheel 223. 68 is another "Divide by Ten" multiple flip-flop circuit and its output to the line 70 includes a square wave signal pulse occuring at a rate of one pulse every 10 feet travel of the wheel 23.

Referring now to the subcircuit D, in FIG. 2, we have shown three differentiating circuits 27, 57 and 72 to which are fed the square wave pulses appearing in the lines 24, 56 and 70, respectively. These three differentiating circuits are identical except for the size of the condensors 25, 58 and 74, respectively.

Differentiating circuit 27 has a resistor 26, a diode 28 and a resistor 30. The condensor 25 is selected so as to give small sharp pips 52 (FIG. 3). Differentiating circuit 57 has a resistor 60, a diode 62 and a resistor 64. The condensor 58 is selected to give a medium size pip 66 (FIG. 3). Differentiating circuit 72 includes a resistor 76, a diode 78 and a resistor 80. The condensor 74 is selected to give a large sharp pip 82 (FIG. 3). The diode 118 and the resistor 222 feed a DC biasing voltage to offset the data presentation as shown at 120 and 123 in FIG. 3. The signal from this DC bias plus the pulses generated from the differentiating circuits are fed by line 34 through the amplifier 36 and associated resistors 38, 40, 42 and 44 to the line 46.

The circuit apparatus thus far described provides means for plotting distance intervals on a time scale with the vertical amplitude of the distance pulses divided by units of 10. The 0.1 foot pips are small, the 1 foot pips are of medium height and the 10 foot pips are maximum height, and thus counting of the pips for calculation purposes is quite convenient. Previous counter recorder mechanisms do not provide this divide by 10 convenience to aid the engineer in distance, speed and acceleration calculations.

It is frequently quite necessary to measure distance traveled and calculate speeds and accelerations between two predetermined events. For example, we may wish to make distance, speed and deceleration calculations for the interval between when vehicle brakes are applied until the instant the vehicle stops moving. Also, in making calculations for traction wheel movement in earth-moving equipment, it is frequently necessary to determine the distance the vehicle moves from the time a shovel is actuated until it reaches a predetermined height. There are enumerable other instances where it is necessary to calculate accurately movement, speed and acceleration or deceleration between the starting and ending of a predetermined operation cycle.

The circuit G, enclosed in dotted lines, is a control circuit for either manually or automatically starting and ending the measuring and recording interval, simultaneously shifting the display on the recorder to indicate the start and end of the recorded event.

Referring to the drawings 90, 92, 94 and 96 are all NAND logic function circuits in which the output is low when the input at both terminals is high, and this output high under all other conditions. The function of the logic circuits 90 and 92 is to bias the voltage placed on the line 34, and thereby to raise the base of the trace on the chart 50 by lowering this bias voltage and to lower the trace on the chart 50 by raising this voltage. (The circuit 29 inverts as well as amplifies.) The function of the logic circuits 94 and 96 are to reset the divide by 10 circuits 22 and 68 at the start of the event so that the pulse does not appear on the line 55 until 10 pulses after the start of an event have appeared on line 21. Similarly, a pulse will not appear on the line 70 until 10 pulses after the start of the event have appeared on line 55. The event is started by closing the switch 84 and maybe ended by closing the switch 99 or ended automatically by the timing circuit, as will be described later.

When the switch 84 is in the open position the circuit including resistors 98, 100 and 102 plus condensors 86 and 88 maintain the voltage at the upper terminal of the nand gate 90 at that positive voltage determined by the voltage divider action of the resistors 100 and 102. The lower input terminal of the nand gate 90 is maintained at a positive voltage through the resistor 106. Under these conditions when both inputs to the nand gate 90 are at this positive voltage, the output is low and thus the lower input terminal to the nand gate 92 is maintained at a low potential.

When the switch 99 is open the upper input terminal of the nand gate 92 is maintained high positive through the resistor 104. Therefore, both nand gates 90 and 92 are in stable conditions when switches 84 and 99 are both open.

Similarly, under these same conditions, the upper terminal of the nand gate 94 is maintained positive by the voltage divider action of the resistor 108 and 114. The lower terminal of 94 is maintained positive at the required high potential by the similar voltage divider action of the resistors 110 and 116. Under these conditions the output terminal of the nand gate 94 and the lower input terminal of the nand gate 96 is low. The upper terminal of the nand gate 96 is maintained high positive by the line 112 from the positive DC voltage in line 7. Under these conditions the output terminal of 96 is maintained high and this is consistent with the voltage that would be applied to this terminal through resistor 113 and across condensor 124 under passive conditions.

Thus when both switches 84 and 99 are open, the high voltage at the output of nand gate 92 results in a negligible voltage drop across the resistors 126 and 128 and, therefore, the emitter and the base of the PNP transistor 130 is at approximately the same voltage and there is no current flowing through the relay coil 132 which operates the normally closed relay switch 134.

The subcircuit F has its elements so chosen as to act as a timing circuit with a time delay of 6.82 seconds from its energization until it automatically goes into the off position.

Referring to the elements of this circuit the conductor 7 is as mentioned before maintained at a positive potential in one particular embodiment of 5.2 volts, while the conductor 9 is maintained at an equal negative potential of 5.2 volts. 142 is a uni-junction transistor. This transistor conducts a low current until fired by the emitter voltage. This emitter voltage, when the switch 134 is closed, is maintained at below the firing voltage by the voltage divider action of resistors 135 and 138 and variable resistor 140. Under these conditions a low current flow is through the resistors 144 or 146 and, therefore, the NPN transistor 148 remains nonconducting and no current flows through the resistor 152. Under these conditions the terminal 150, when connected to the terminal 151, electrically floats.

5 is, as mentioned above, a DC voltage supply of common design having a positive output 7, a negative output 9 and a grounded line 11.

Referring now to FIG. 3, the chart 50 produced by the recorder 48 is shown in greater detail. The chart, as shown, illustrates a brake test in which the vehicle starts at the point 119 on the chart, accelerates up to and runs at constant speed until the brake is applied at the point 120 and the baseline is dropped to measure the time-distance function during the braking until the vehicle is again stopped at 123. In this chart 52 are the 0.1 foot pips, 66 are the 1 foot pips and 82 are the pips that occur every 10 feet of vehicle movement. 54 and 1 second interval markers.

As shown in this figure, the chart moves to the left at a uniform speed while the marker moves vertically from a baseline at an amount dependent on the voltage impressed upon the marker electrical actuator.

Having thus described the various elements used in the present invention, the following is one mode of operation of the invention.

OPERATION OF THE INVENTION

As the wheel 223 rolls over the surface 225 to be measured, the equi-spaced transparent holes or slots 3 pass between the lamp or other light source 2 and a photocell 4 so as to allow the light source 2 to energize photocell 4 at intervals of 0.1 foot travel of wheel. The photocell 4 is electrically energized by about 5.2 volts positive by the electrical conductor 7 from the power supply 5 through a current limiting resistor 6. It will, therefore, be seen that the voltage on the base of the NPN transistor 14 is determined by the voltage divider action of the resistor 6, resistor 8, diode 12 and resistor 10. When the photosensitive device 4 is made conductive by receiving light energy through the opening 3, this voltage produced on the base of the transistor 14 drops to a potential much below that impressed when the device 4 is nonconductive. Thus, a signal is impressed on the base of the transistor 14 which goes negative from a base voltage of about 5 volts. Due to the light intensity characteristic caused by the variation in the illumination of the photosensitive cell, as the opening 3 passes between it and the lamp 2, this pulse goes negative from the plus 5 volt baseline as quite roughly a half of a sine wave. The diode 12 aids in damping out transient signals which may otherwise distort the signal input to the base of transistor 14 and thus distort the output signal at the collector electrode of this transistor. The output of the transistor 14 is roughly the lower half of a sine wave from a positive voltage datum line. Resistances 15, 17 and tunnel diode 16 shape the roughly half sine wave into a square wave, which square wave is impressed on the base of the NPN transistor 18 through the resistance 20. Since the circuit associated with the transistor 18 is a common collector electrode circuit, the output is in phase with the input and, therefore, negative square wave pulses from a positive datum line is produced at the collector electrode and fed to the divide by ten circuit 22 and to the differentiating circuit 27 through lines 21 and 24. These negative depending pulses cannot go below a predetermined positive voltage above ground. The leading edge of this square wave 24 causes a sharp negative pulse to appear in the line 32, the height of which is dependent on the value selected for the condensor 25. As mentioned previously, the condensor 25 is selected to give a smaller pulse that that produced by the differentiating circuit 57 and a much smaller pulse than that produced by the differentiating circuit 72.

The divide by ten circuit 22 produces a negative depending square wave in the lines 55 and 56 at a rate of one for every tenth square wave which it receives. This square wave leading edge causes a negatively depending sharp pulse to be produced in the differentiating circuit 57, the height of which is greater than that produced by the circuit 27.

The divide by ten circuit 68 produces a square wave negative depending pulse in line 70 which is fed to the differentiating circuit 72. In this circuit the condensor 74 is so selected as to give a pulse much larger than produced by the circuit 57. These three pulses are combined and fed into the inverting amplifier 36 so that they appear in the line 46 as positive pulses above a predetermined DC datum voltage. The pulses from the differentiating circuit 27 appear as the pulses 52 on the chart 50, the pulses from the differentiating circuit 57 appear as the pulses 66 and those from differentiating circuit 72 appear as the vertical pulses 82 on the chart. The datum DC voltage upon which these electro DC pulses are impressed is produced at the point 34 through the resistors 222 and diode 118, as will be described later.

Referring to FIG. 3 the operation of the circuit as thus far described would produce a chart as mentioned above in describing the elements of the circuitry. This invention provides means for starting the counting at a happening of one event and indicating when that counting started, and also for indicating the end of the event so proper calculations may be made. This starting and ending of the counting may be either initiated by the starting and ending of the event or started by the starting of the event and ended a time delay of 6.82 seconds later. The operation of this control circuit in both modes will be now described.

Referring to the drawings 90, 92, 94 and 96 are all NAND logic circuits in which the output is low when both inputs are high, and the output is high under all other conditions.

The function of the logic circuits 90 and 92 is to produce a datum base bias voltage on the line 34 and to thereby raise the base of the trace on the chart 50 by lowering this bias voltage and to lower the trace on the chart 50 by raising this bias voltage. The circuit 29 inverts as well as amplifies. The function of the logic circuits 94 and 96 are to reset the divide by 10 circuit 22 and 68 at the start of an event so that a pulse does not appear on line 55 until ten pulses after the start of the event have appeared on line 21. Similarly, a pulse will not appear on the line 70 until 10 negative square wave pulses after the start of the event have appeared on the line 55. The event is started by closing the switch 84 and may be ended by closing the switch 99 or ended automatically by the timing circuit, as will be described later.

With the switch 84 open, the circuit including resistors 98, 100 and 102 plus condensors 86 and 88 maintain the voltage at the upper input terminal of nand gate 90 high positive. If the output terminal of nand gate 92 is high, the lower input terminal of nand gate 90 will be high and, therefore, the output terminal of nand gate 90 will have a low potential.

If the switch 99 is open the upper input terminal of nand gate 92 is high and with the lower input terminal low the output terminal of nand gate 92 will be high and positive. Under these conditions, namely those with both switch 84 and 99 open, both input terminals to nand gate 90 are high positive with the output terminal low. This in turn causes the lower input terminal of 92 to be low. Therefore, nand gate 90 and 92 are in stable conditions when switches 84 and 99 are open.

Similarly, under these conditions the upper input terminal of nand gate 94 is maintained high positive by a voltage divider consisting of resistors 108 and 114 and the lower input terminal of nand gate 94 is similarly maintained high by voltage divider including resistors 110 and 116. The upper terminal of nand gate 96 is maintained high positive through conductor 112. Under these conditions, the output terminal of nand gate 94 is low, as is the lower input terminal of nand gate 96. This results in the output terminal of nand gate 96 being high. Thus, when switches 84 and 99 are open nand gate 94 and 96 are in a stable condition. Under these conditions with the output terminal nand gate 92 being high positive, there is very little current flowing through the resistors 126 and 128 and, therefore, the voltage on the base of the PNP transistor 130 is such that this transistor remains in the nonconducting condition and no current flows through the relay coil 132 and the switch 134 remains in the closed position.

When switch 84 is closed, the upper input terminal of nand gate 90 is dropped to a low voltage. Under this set of conditions, the output terminal of nand gate 90 goes high, thereby raising the bias potential on the line 34 through the diode 118 and the resistor 222. Since the amplifier 29 also inverts, this raising of the bias potential on the line 34 causes the dropping of the baseline on the chart 50 as is shown at 120 in FIG. 3. This raising of the voltage at the output terminal on nand gate 90 also raises the voltage at the lower input terminal on nand gate 92, thus lowering the positive voltage at the output terminal on nand gate 92 and at the lower input terminal on nand gate 90. This locks nand gate 90 so that high voltage is maintained at the output terminal even though the switch 84 is released and placed in the open position. This drop in voltage at the output terminal of nand gate 92 holds down the positive voltage at the upper input terminal of nand gate 94 through the sharp drop in voltage across condenser 122. This change in voltage results in the output terminal C of nand gate 94 going high positive as does the lower input terminal of nand gate 96. This sends a pulse of current back to the divide by 10 multivibrator divider circuits 22 and 68 to reset these circuits so they start counting over. This drives the output terminal of nand gate 96 to a low positive, which causes a sharp drop of voltage across the condenser 124. This condenser 124 also drops the lower input terminal of nand gate 94 to a low potential until condenser 124 discharges, returning nand gates 94 and 96 to their initial condition.

Dropping of the output terminal voltage of nand gate 92 to low potential causes the transistor 130 to conduct because of the voltage bias placed on the plate thereof by the voltage drop across the resistors 126 and 128. The conducting of transistor 130 actuates the relay circuit 132 thus opening the normally closed contacts of the switch 134. The opening of these contacts allows the condenser 136 to start charging through the fixed resistor 138 and the variable resistor 140. Variable resistor 140 is adjusted to the value at which the voltage on the condenser 136 will be sufficient to fire the uni-junction transistor 142 in the desired time interval. A very useful lapse of time for this circuit to operate is 6.82 seconds. This is a very useful conversion factor since the 10 foot pips appearing during that time interval may be counted as miles per hour. The firing of the uni-junction transistor 142 causes a voltage drop across the resistor 144 by current flowing through that resistor and resistor 146. This causes the NPN transistor 148 to fire, thus dropping the voltage at conductor 150 to near ground potential due to the voltage splitting action of resistors 152 and 104. The side of 104 opposite that of the conductor 150 is at approximately 5.2 volts while the terminal of the resistor 152 opposite the terminal connected to conductor 150 is maintained at −5.2 volts. The resistance drop across resistor 152 plus the drop across NPN transistor 148, when it is conducting, is approximately the same as the resistance of resistor 104. At the end of the predetermined time at which 138 fires 142, the voltage at the upper input terminal of nand gate 92 is driven to approximately 0 voltage. This drives the output terminal of nand gate 92 high, which in turn drives the lower input terminal of nand gate 90 high. This results in both input terminals of nand gate 90 being high, which makes the output terminal go low thus removing the biasing voltage from the amplifier 29 and thus raising the baseline on the chart 50 to above its original position.

In cases where it is desirable to have the time interval ended by a manual or mechanical operation of a switch or other means, the equivalent of switch 99 is used. Upon closing of switch 99 the electrical potential of the upper input terminal 92 is dropped to zero, thus setting in action the same set of circumstances as mentioned above to move the data line on the chart back to its original position.

When the output terminal of the nand gate 92 goes high, the transistor 130 is again made nonconducting which de-energizes relay 132 and thus again closes the normally closed switch 134 shorting the timing condenser 136 and making the timing circuit inoperative.

The circuit has now been placed in its original condition and is ready to repeat the operation.

Referring now to FIG. 3, a time-distance chart is shown as it is presented on a standard recorder. On such a recorder the chart moves to the left at a uniform speed of about 1 inch per second. (Pulses 54 are one second markers with the distance 300 a second. Voltage is plotted vertically on this chart and, therefore, the height of the pip indicates the magnitude of the positive voltage.) A typical chart is shown in which the vehicle accelerates from 119 to 121 and runs at a uniform rate from the point 121 to the point 120. During this time the small pips 52 are too close together to be recognized and the 1 foot pips 66 may be counted. The 10 foot interval pips 82 aid in the counting of the smaller pips. At the point 120 the brake is applied to the vehicle closing the switch 84. As the vehicle decelerates the pips become further apart until at the point 123 the vehicle stops, closing the switch 99, which ends the cycle and resets the circuits. The stopping time is shown as 301. The stopping distance may be calculated by counting the pips. The deceleration rate may be calculated by determining the rate of change of distance between the pips.

While this specification contains a written description of the invention and the manner of making and using it in the best mode contemplated for carrying out the invention, there are many variations, combinations, alterations and modifications which may be made within the spirit of the invention and the scope of the appended claims.

We claim:

1. Apparatus for measuring and recording distance and time comprising:
    means for producing electrical pulses at predetermined distance intervals,
    means for counting said electrical pulses and producing a predetermined multiple pulse of greater magnitude than said first mentioned pulses for each tenth of said electrical pulses,
    chart means driven at a uniform velocity,
    means for recording the magnitude of said pulses on said chart means in a direction normal to the direction of movement of said chart,
    including a first switching means for starting the sequence of counting,
    a second switching means for stopping said sequence of counting,
    said first switching means resetting said means for counting said electrical pulses whereby said multiple pulse of greater magnitude occurs ten electrical pulses after the closing of said switch.

2. Apparatus for measuring and recording distance and time as claimed in claim 1 in which;
    said second switching means is automatically actuated a preselected time interval after the actuation of said first switching means.

3. Apparatus for measuring and recording distance and time as claimed in claim 1 including;
    means for indicating on said chart means the activation of said first switching means and said second switching means.

4. Apparatus for measuring and recording distance and time as claimed in claim 2 including;
    means for indicating on said chart means the time of actuation of said first switching means and said second switching means.

5. Apparatus for measuring and recording distance and time as claimed in claim 2;
    one set of pulses produced on said chart are spaced at 10 foot distance intervals, and said time interval is 6.82 seconds whereby, the number of said pulses produced on said chart is equal to the average speed in miles per hour.

6. Apparatus for measuring and recording distance and time as claimed in claim 4 in which;
one set of pulses recorded on said chart are spaced to indicated 10 foot distance intervals and,
the time interval between the actuation of said first switching means and said second switching means is 6.82 seconds whereby,
the number of pulses indicated on said chart equals the speed being measured and recorded in miles per hour.

* * * * *